George M. Fulmer
James Leon Conner
INVENTORS

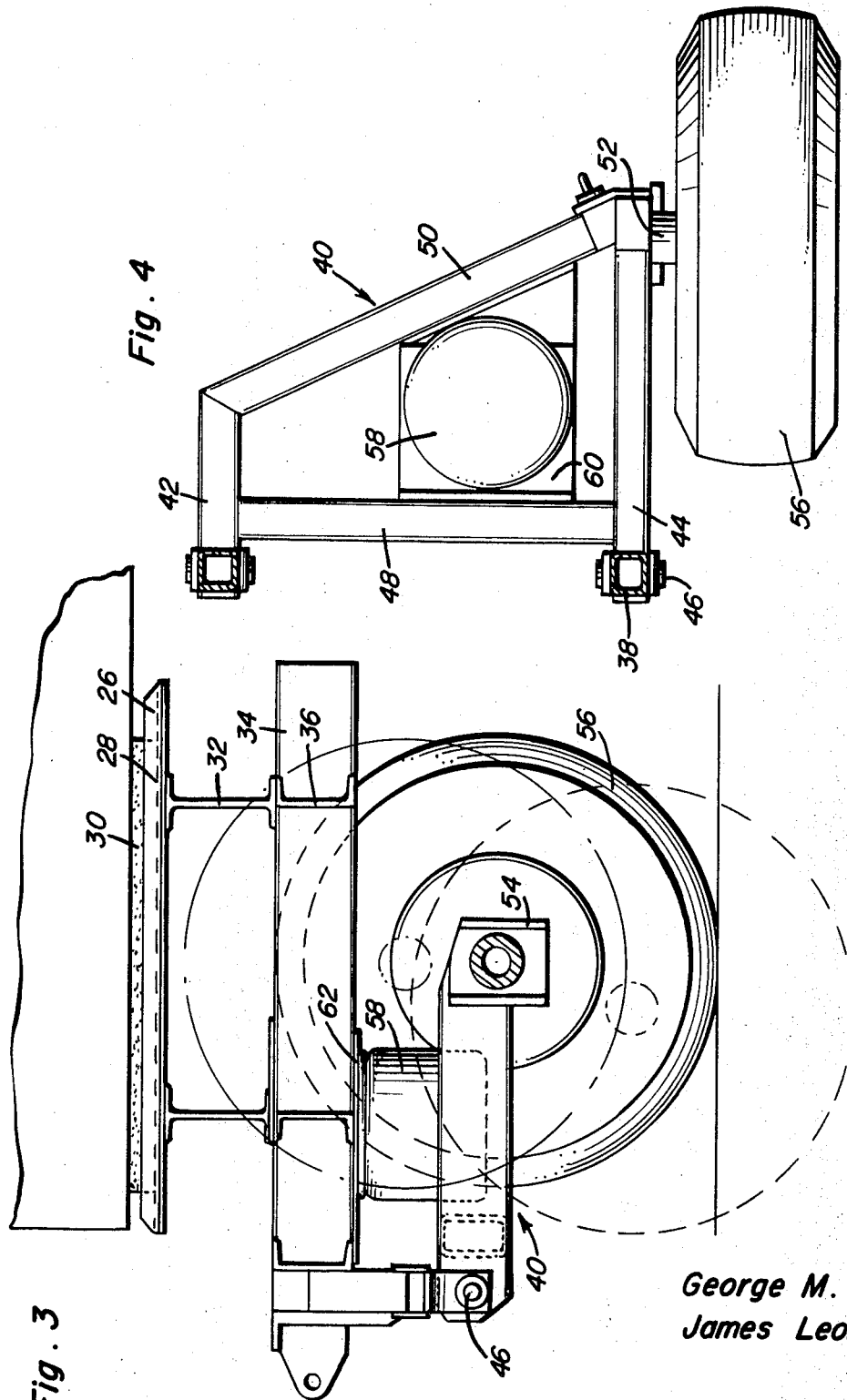

United States Patent Office 3,532,354
Patented Oct. 6, 1970

3,532,354
LOAD CARRIER WITH ELEVATABLE LOAD ENGAGING SURFACE WITH INDEPENDENT WHEEL SUSPENSION
George M. Fulmer and James Leon Conner, Silver Spring, Md., assignors to Gichner Mobile Systems, Inc., a corporation of Maryland
Filed Nov. 14, 1968, Ser. No. 775,645
Int. Cl. B62d 21/18
U.S. Cl. 280—43.18
1 Claim

ABSTRACT OF THE DISCLOSURE

A towed vehicle including two wheeled units normally spaced apart by a reach pole and capable of being moved towards and away from each other when loading a load carrying body or unloading a load carrying body. Each wheeled unit includes a pair of independently suspended wheel assemblies supported by air bag units for enabling variation in the elevational position of each of the wheels independent of the other.

---

This application discloses improvements on the structure disclosed in copending application Ser. No. 583,245, filed Sept. 30, 1966, for Load Carrier With Elevatable Load Engaging Surface assigned to the same assignee.

The present invention generally relates to load carrying devices having elevatable load engaging surface areas with an independent wheel suspension so that the load engaging surface of the load carrier may be oriented in alignment with a cargo compartment, cargo ramp, dock or other surface which will receive or has a load body disposed thereon so that the load carrying body may be expeditiously loaded onto the load carrier or unloaded from the load carrier with the independent wheel suspension being independently adjustable to enable the load engaging surface to be oriented in a desired angular position as well as a desired elevated position.

The present invention has particular utility when used in conjunction with a load carrying body such as a shelter unit which is a self-supporting unit having supporting skids or surface areas on the bottom thereof. Frequently, such units are desired to be transported from a loading dock or ramp to an aircraft or other vehicle having an elevated load receiving surface. The elevational position of the cargo ramp, cargo floor, loading dock or the like is variable for many reasons. With this invention, the load engaging surface or surfaces are capable of variation in elevation and also the independent wheel suspension enables the load engaging surface or surfaces to be oriented in a desired position by selective inflation and deflation of the air bags to orient the load engaging surfaces angularly about a longitudinal axis as well as to change their vertical position.

In carrying out the present invention, each wheel unit is supported on a short stub axle carried by a supporting frame pivotally carried by the frame members of the load carrier for swinging movement about a transverse axis disposed in longitudinally spaced relation to the wheel axle. An air bag interconnects the main frame of the load carrier and the pivotal subframe or arm assembly at a point intermediate the pivot axis of the arm assembly and the wheel axle so that vertical swinging movement of the wheel axle will be at a ratio of 2:1 in relation to the extension and retraction of the air bag.

The load carrier of the present invention includes load supporting members for supporting a load such as a shelter unit or van in the same general manner as disclosed in the aforementioned copending application with the basic improvement of this invention as compared with that disclosed in the copending application residing in the provision of the independent wheel suspension with each subframe or supporting arm assembly for the wheel being pivotally supported and provided with an air bag suspension assembly which acts as a spring for cushioning or absorbing load shocks and also serves as a means for raising or lowering the height of the load carrying members while loading or unloading a shelter unit or the like with the independent extension and retraction of the air bags enabling the load engaging surfaces to be oriented in a desired position as required for each individual loading and unloading operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is a detail side elevational view of one of the wheel units illustrating the degree of independent adjustment of the wheel; and FIG. 4 is a detail plan view of the subframe or arm assembly.

Figure 1:
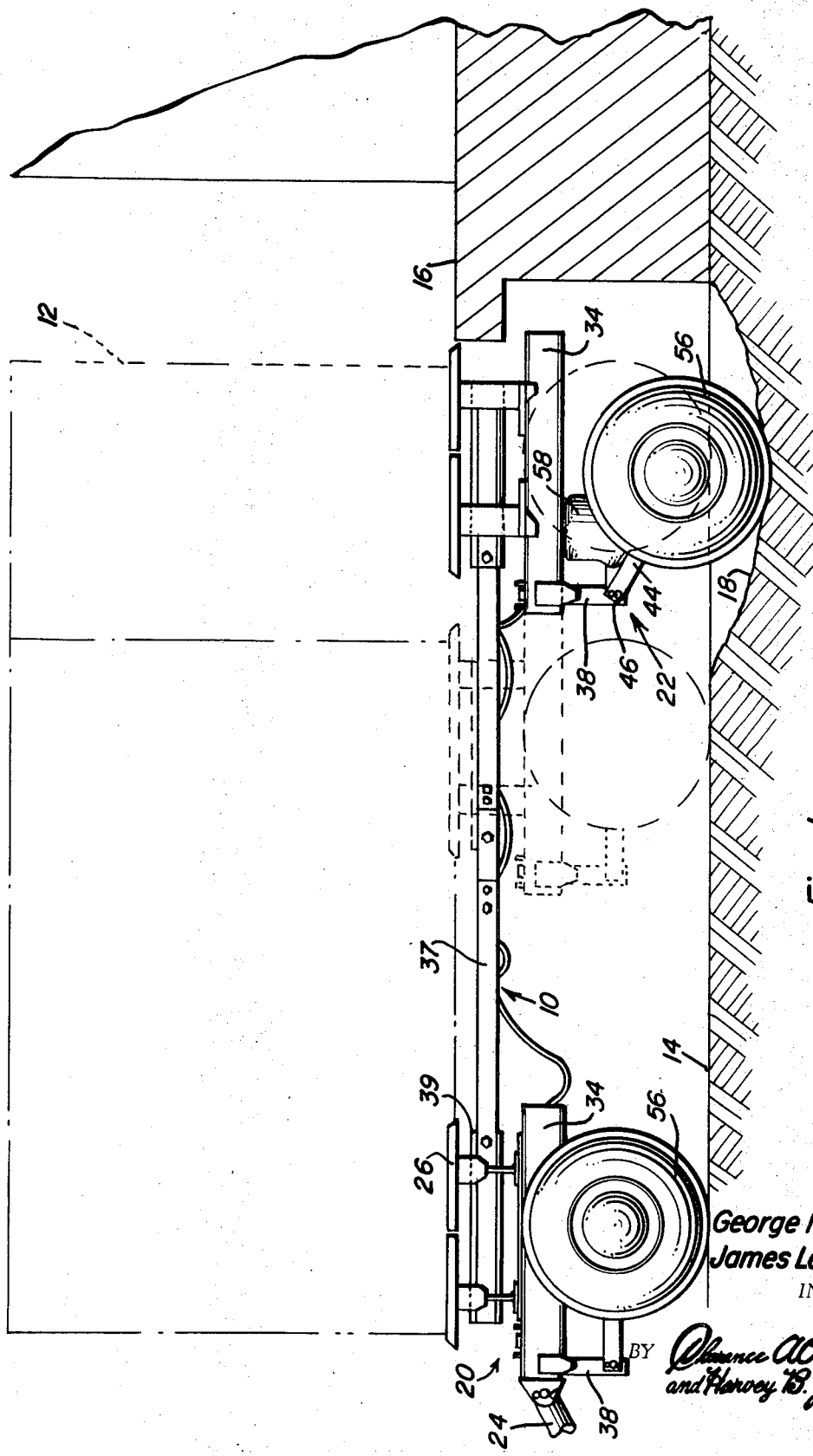
FIG. 1 is a side elevational view of the load carrier of the present invention illustrating one independent wheel assembly lowered in order to orient the load engaging surfaces in a desired angular position in relation to a loading dock or ramp.
Figure 2:
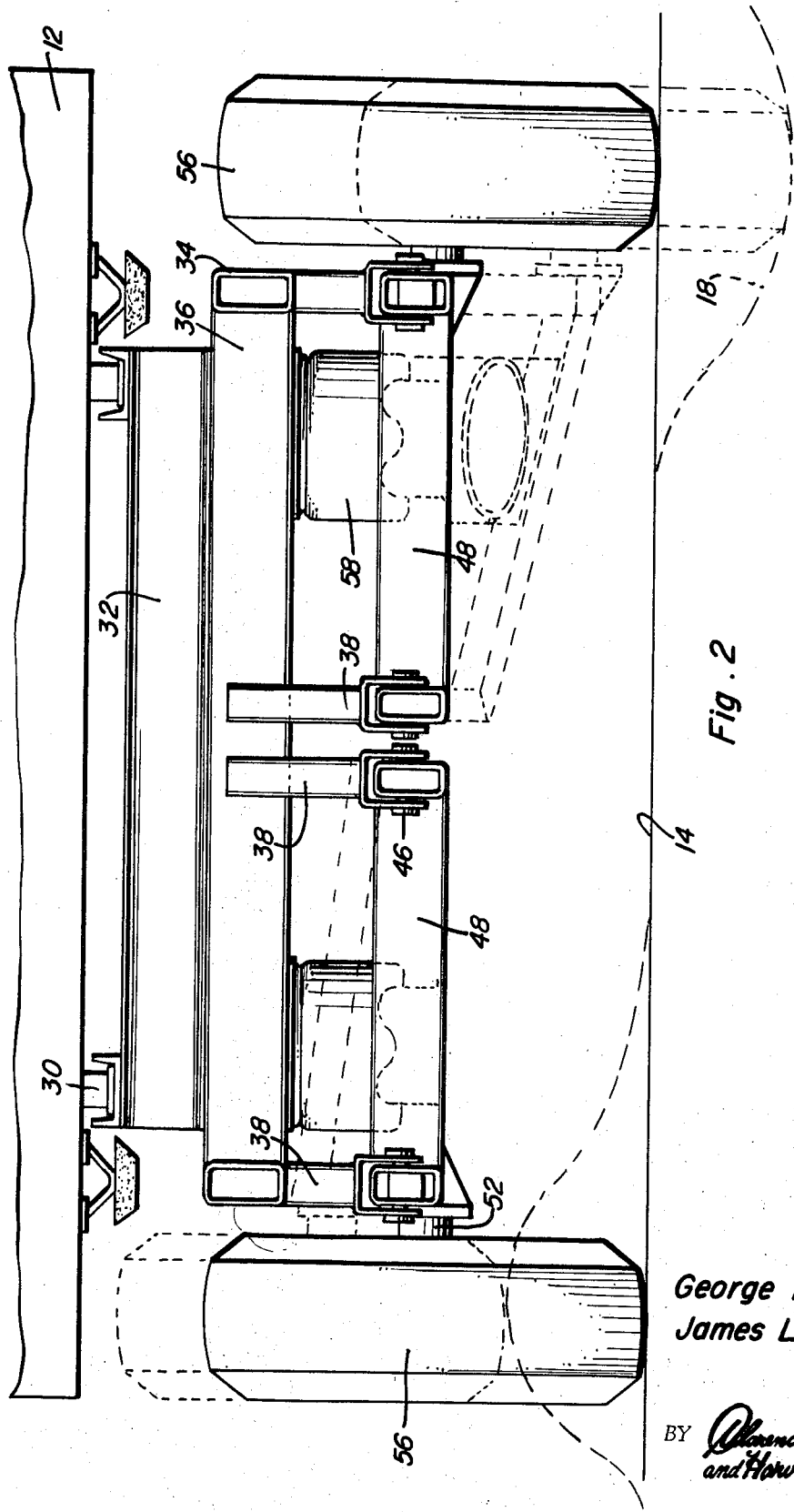
FIG. 2 is a rear elevational view of the load carrier illustrating dotted line positions of the wheel units illustrating the independent elevational changes therein.

Referring now specifically to the drawings, the numeral 10 generally designates the load carrier of the present invention for use in conveying a load in the form of a shelter unit or the like 12 over the ground surface 14 and loading or unloading the load carrying unit 12 onto a surface such as a loading dock 16, cargo ramp or cargo floor of an aircraft or other vehicle. The load unit may be in the form of a box-like shelter unit or van of rigid construction of predetermined modular size which may contain various equipment, mechanism or the like constituting the load. It will be appreciated that the elevational position of the load receiving surface 16 may vary in height at different loading docks, in different aircraft or other vehicles. Also, the ground surface 14 may in some instances have depressed areas 18 or other irregularities which would prevent the load unit 12 from being moved onto the load receiving surface 16 as is illustrated in FIG. 1.

The load carrier 10 includes two separate units designated as a front unit 20 and a rear unit 22 which are substantially identical but the front unit 20 has a tongue 24 pivotally attached thereto for connection with a suitable towing vehicle. Each of the units 20 and 22 includes a pair of load engaging and supporting members 26 of substantially channel-shaped configuration with a pad 28 of plastic material or the like therein receiving depending longitudinal skid members 30 on the bottom surface of the load unit 12. The support members 26 are supported from transverse frame members 32 which are connected with longitudinal frame members 34 which are also provided with transversely extending interconnected frame elements 36 all of which represent a rigid construction. The front and rear units are interconnected by a removable reach pole 37 which is telescopic and detachable from sockets 39 disposed in the front and rear units. The construction of the support members, the reach pole and frame elements in this invention are substantially the same as that disclosed in the aforementioned copending application.

The forward end of the main frame is provided with a pair of rigid and parallel downwardly extending support brackets 38 which are spaced laterally and in alignment with each other. A pair of brackets 38 is disposed to each side of the load carrier and are rigidly attached such as by welding or the like to the main frame or chassis of the load carrier.

Attached to the lower ends of the brackets and extending rearwardly in trailing relation thereto is a subframe or arm assembly generally designated by the numeral 40 which includes a pair of longitudinal frame members 42 and 44 oriented in parallel relation to each other with the forward ends of the longitudinal members 42 and 44 being pivotally connected to the lower ends of the pair of brackets 38 by a pivot pin or bolt 46 so that the subframe or arm assembly 40 may swing in a vertical plane about a transverse horizontal axis defined by the transversely aligned pivot bolts or pins 46. Rigidly interconnecting the forward end portions of the longitudinal members 42 and 44 is a transverse frame member 48 and rigidly interconnecting the rear ends of the longitudinal members 42 and 44 is an inclined frame member 50 which interconnects the rear end of the shorter longitudinal member 42 with the rear end of the longer longitudinal member 44 as illustrated in FIG. 4. At the rear end of the longitudinal member 44, a stub axle 52 is supported in any suitable manner such as by bracket members 54 or the like rigid with the arm assembly or subframe 40. A supporting wheel unit 56 is rotatably supported by the axle 52 in a conventional and well-known manner so that the wheel 56 as well as the axle 52 may swing in a vertical arc about a center defined by the pivot pin or bolt assemblies 46 with the movement and maximum elevated position and maximum lowered position illustrated in broken line in FIG. 3.

An air bag 58 is interposed between a plate 60 carried by the subframe 40 and a plate of 62 mounted on the main frame members 34 and 36. The plate 60 is rigidly affixed to the frame members 48 and 50 as by welding or the like and the air bag 58 is attached to the plates 60 and 62 in a known and conventional manner. The location of the air bag 58 is intermediate and substantially one half of the distance between the pivot bolts or pins 46 and the axle 52 so that the ratio of movement of the axle 52 and thus the wheel 56 is 2:1 with the scope of movement of the lower center point of the air bag 58 inasmuch as the axle 52 is located twice the distance from the pivot axis 46 as is the center of the air bag 58.

The load carrier disclosed herein would also be provided with the usual shock absorbers, limit devices for limiting the pivotal movement of the subframe, an air tank or pump and control valve means for admitting and exhausting air from the air bags all as disclosed in the aforementioned copending application. Thus, by using an air tank having a supply of compressed air therein, any one or any number of the air bags may be extended or retracted by exhausting air from the air bags to thus extend or retract the air bags to enable the load engaging members to be supported in a substantially horizontal plane or any other desired angular position so that unevenness of the ground surface such as a recess or rut or projection or hill in the ground surface may be compensated for by correspondingly extending or retracting the air bag with the extension of the air bag causing the wheel unit to lower by admitting air into the air bag and retraction of the air bag permitting the wheel to move upwardly in relation to the frame by exhausting air from the air bag.

Also, various ancillary items may be provided on the load carrier such as reflector units on the sides and rear, running lights, brake lights and the like as required by various regulations for operation on public highways. In addition, hooks and anchor devices may be provided for enabling the load to be secured in place and enabling connection of trailing towed units may be provided and hose supports for supporting various brake hoses, air hoses and the like may also be provided as deemed necessary. The particular construction of the tire and wheel assemblies, axle assemblies, brakes, shock absorbers are not illustrated in detail since these are conventional and commercially available products employed in the usual manner.

Latch structures may be provided on the rear of the rear unit for positive connection with a cargo aircraft or other load dock to retain the rear unit in connection with the aircraft to enable the front unit to be moved toward the rear unit or to enable the front unit to be moved outwardly in relation to the rear unit for enabling the load unit to be discharged or placed onto the load carrier.

The reach pole which interconnects the front and rear units is removable and can telescope in relation to each section so that the device may be assembled in a short coupled condition for towing the load carrier in a short coupled condition without a load thereon. In some arrangements, the reach pole may not be necessary even when carrying a load unit with the load unit itself serving to retain the front and rear units of the load carrier in their proper spaced and aligned relation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A load carrying vehicle comprising a front and rear wheeled unit each of which includes a load supporting surface, said front and rear units being independent and spaced from each other when supporting a load and movable toward each other to slide the load over the load supporting surface of one of said units when the other of said units is moved in relation thereto, said units being retained in spaced relation by an adjustable reach pole during over-the-road operation, each wheeled unit including an axle and wheel means underlying the load supporting surface, and suspension means between each axle and wheel means and load supporting surface for supporting the load supporting surface and cushioning road shock, said suspension means on said units selectively adjusting the elevational position of the load supporting surfaces in relation to each other and in relation to load supporting means independent of the vehicle, said axle and wheel means and suspension means associated with each wheeled unit including an independent axle, wheel and suspension assembly orientated at each side of the load supporting surface for independently varying the elevational portion of one side of the load supporting surfaces in relation to the elevational position of the other side of the load supporting surfaces in order to level the load supporting surfaces with a load supporting means independent of the vehicle, each independent suspension assembly including a pair of transversely spaced and aligned depending brackets rigid with the load supporting surface, a subframe pivotally connected to the lower ends of said brackets for pivotal movement about a transverse axis extending between the brackets, said subframe extending rearwardly from the brackets, said axle being rigidly mounted on said subframe at the rear end thereof in generally parallel relation to the transverse axis and rotatably supporting the wheel, and an air bag interconnecting the load supporting surface and the subframe substantially centrally between the axle and pivotal connection between the subframe and brackets, said air bag cushioning vertical arcuate movement of the wheel during over-the-road operation, said subframe being generally parallel to the load supporting surface when the air bag is in normal operating condition thereby enabling the transverse end portions of the load supporting surface to be raised or lowered independently for varying the elevation and transverse attitude of the load supporting surface.

References Cited

UNITED STATES PATENTS

| | | | |
|---|---|---|---|
| 2,034,842 | 3/1936 | Stratton | 280—404 |
| 2,879,076 | 3/1959 | Stricker | 280—104.5 |
| 3,102,738 | 9/1963 | De Roshia | 280—415 |
| 3,347,563 | 10/1967 | Harbers | 280—415 |

BENJAMIN HERSH, Primary Examiner

R. R. SONG, Assistant Examiner

U.S. Cl. X.R.

280—43.23